(12) United States Patent
Wei et al.

(10) Patent No.: US 11,479,066 B2
(45) Date of Patent: Oct. 25, 2022

(54) TIRE ELECTRONICS SECURING STRUCTURES

(71) Applicant: Bridgestone Americas Tire Operations, LLC, Nashville, TN (US)

(72) Inventors: Terence E. Wei, Copley, OH (US); Paul B. Wilson, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 396 days.

(21) Appl. No.: 16/421,755

(22) Filed: May 24, 2019

(65) Prior Publication Data

US 2019/0275849 A1 Sep. 12, 2019

Related U.S. Application Data

(62) Division of application No. 15/540,583, filed as application No. PCT/US2015/060511 on Nov. 13, 2015, now Pat. No. 10,336,144.

(60) Provisional application No. 62/097,928, filed on Dec. 30, 2014.

(51) Int. Cl.
*B60C 5/04* (2006.01)
*B60C 23/00* (2006.01)
*B60C 23/04* (2006.01)
*B60C 5/02* (2006.01)
*B29D 30/00* (2006.01)

(52) U.S. Cl.
CPC ............ *B60C 23/0493* (2013.01); *B60C 5/02* (2013.01); *B60C 5/04* (2013.01); *B29D 2030/0072* (2013.01); *B29D 2030/0077* (2013.01); *B29D 2030/0083* (2013.01)

(58) Field of Classification Search
CPC .... B60C 5/02; B60C 5/04; B60C 5/08; B60C 5/10; B60C 19/12; B60C 19/122; B60C 19/127; B60C 23/04
See application file for complete search history.

(56) References Cited

U.S. PATENT DOCUMENTS 1,002,214 A * 9/1911 Bernier ................. B60C 19/122
152/157
1,653,054 A * 12/1927 Mack ...................... B60C 17/01
152/400
(Continued)

FOREIGN PATENT DOCUMENTS

CN 201484079 5/2010
DE 10051735 * 5/2002
(Continued)

OTHER PUBLICATIONS

International Search Report and Written Opinion; Corresponding PCT Application No. PCT/US2015/060511; filed Nov. 13, 2015; Authorized Officer Bae, Guen Tae; dated Feb. 19, 2016.
(Continued)

*Primary Examiner* — Justin R Fischer

(57) ABSTRACT

A tire and securing element assembly includes a tire inflated at a first pressure and a securing element. The securing element is an inflatable hoop inflated at a second pressure at least 10% greater than the first pressure. The securing element abuts an inner surface of the tire across 30-90% of a tread width. The securing element has a cross sectional area between about 0.4 and 47.0 cm².

15 Claims, 6 Drawing Sheets

(56) References Cited

U.S. PATENT DOCUMENTS

| | | | |
|---|---|---|---|
| 2,754,876 A * | 7/1956 | King | B60C 17/01 |
| | | | 152/341.1 |
| 2,861,619 A * | 11/1958 | Wyman | B60C 17/01 |
| | | | 152/340.1 |
| 4,811,796 A | 3/1989 | Allen | |
| 5,479,976 A * | 1/1996 | Cho | B60C 5/22 |
| | | | 152/342.1 |
| 6,462,650 B1 | 10/2002 | Balzer et al. | |
| 6,997,223 B2 | 2/2006 | Naito | |
| 7,028,732 B1 | 4/2006 | Phelan | |
| 7,468,655 B2 | 12/2008 | Logan | |
| 8,640,534 B2 | 2/2014 | Sheikh-Bahaie | |
| 8,695,654 B2 | 4/2014 | Manfred | |
| 9,087,506 B1 | 7/2015 | Kraft | |
| 2002/0046791 A1 | 4/2002 | Rensel et al. | |
| 2004/0206438 A1 | 10/2004 | Takeyama | |
| 2009/0159169 A1 | 6/2009 | Durif | |
| 2010/0116399 A1 | 5/2010 | Adams | |
| 2011/0041309 A1 | 2/2011 | Shepler | |
| 2011/0223366 A1 | 9/2011 | Petri | |
| 2012/0291933 A1 | 11/2012 | Tanno | |
| 2013/0133800 A1 | 5/2013 | Griffoin | |
| 2013/0160914 A1 | 6/2013 | Oba | |
| 2014/0124633 A1 | 8/2014 | Benard | |
| 2016/0089934 A1* | 3/2016 | Krefting | B60C 17/06 |
| | | | 152/157 |

FOREIGN PATENT DOCUMENTS

| | | |
|---|---|---|
| DE | 10255138 | 6/2004 |
| DE | 102007050234 | 4/2008 |
| DE | 102007008043 | 8/2008 |
| DE | 102008029534 | 2/2009 |
| DE | 102009008350 | 2/2010 |
| DE | 102009002312 | 10/2010 |
| EP | 1253025 | 10/2002 |
| EP | 2468532 | 6/2012 |
| FR | 2624800 | 6/1989 |
| GB | 2191453 | 12/1987 |
| JP | 2006021611 | 11/2006 |
| JP | 2008230411 | 2/2008 |
| JP | 2009018607 | 11/2009 |
| JP | 4407181 | 3/2010 |
| WO | 2001012452 | 2/2001 |
| WO | 2008143326 | 11/2008 |
| WO | 2012069515 | 5/2012 |
| WO | 2013090493 | 6/2013 |
| WO | 2014041060 | 3/2014 |

OTHER PUBLICATIONS

Non-Final Office Action; Parent U.S. Appl. No. 15/540,583; filed Jun. 29, 2017; dated May 23, 2018.

Final Office Action; Parent U.S. Appl. No. 15/540,583; filed Jun. 29, 2017; dated Sep. 21, 2018.

Non-Final Office Action; Parent U.S. Appl. No. 15/540,583; filed Jun. 29, 2017; dated Nov. 30, 2018.

* cited by examiner

TIRE ELECTRONICS SECURING STRUCTURES

CROSS-REFERENCE TO RELATED APPLICATIONS

The present disclosure is a divisional of U.S. patent application Ser. No. 15/540,583, filed on Jun. 29, 2017, which in turn is a 371 national stage entry of PCT/US2015/060511, filed on Nov. 13, 2015, which in turn claims the benefit of U.S. Provisional Patent Application No. 62/097,928, filed on Dec. 30, 2014. The disclosures of these references are incorporated herein in their entirety.

FIELD OF INVENTION

The present disclosure is directed to tires featuring electronics packages and structures and membranes for securing the electronics packages. More particularly, the present disclosure is directed to tires containing annular hoops, electronics bands, and flexible and semi-flexible membranes used to secure electronics packages. The tires may be pneumatic or non-pneumatic.

BACKGROUND

Known tires include electronics packages containing sensors and RFIDs. The electronics packages are bonded to, or within, the tire. Securing electronics packages using known methods and components requires certain apparatuses (e.g., wheel mounts), structures (e.g., patches), or adhesives (e.g., glue or vulcanizing compounds).

SUMMARY OF THE INVENTION

In one embodiment, a tire and securing element assembly includes a tire inflated at a first pressure. The tire includes a first annular bead and a second annular bead, a body ply extending between the first annular bead and the second annular bead, and an innerliner extending between the first annular bead and the second annular bead across at least a portion of a surface of the body ply. The tire further includes a circumferential belt disposed radially upward of the body ply and extending axially across a portion of the body ply, and a circumferential tread disposed radially upward of the circumferential belt and extending axially across a portion of the body ply. The tire also includes a first sidewall extending between the first annular bead and a first shoulder. The first shoulder is associated with the circumferential tread. The tire further includes a second sidewall extending between the second annular bead and a second shoulder. The second shoulder is associated with the circumferential tread. The assembly also includes a securing element having an annular, flexible, inflatable, tubular body inflated at a second pressure that is at least 10% greater than the first pressure. The securing element contacts a portion of the innerliner.

In another embodiment, a tire and securing element assembly includes a tire inflated at a first pressure and a securing element. The securing element is an inflatable hoop inflated at a second pressure at least 10% greater than the first pressure. The securing element abuts an inner surface of the tire across 30-90% of a tread width. The securing element has a cross sectional area between about 0.4 and 47.0 cm$^2$.

In yet another embodiment, a tire and securing element assembly includes a tire having a first annular bead and a second annular bead, and a body ply extending between the first annular bead and the second annular bead. The tire also includes an innerliner extending between the first annular bead and the second annular bead across at least a portion of a surface of the body ply. The tire has a circumferential belt disposed radially upward of the body ply and extending axially across a portion of the body ply. A circumferential tread is disposed radially upward of the circumferential belt and extends axially across a portion of the body ply. The tire also has a first sidewall extending between the first annular bead and a first shoulder. The first shoulder is associated with the circumferential tread. The tire further includes a second sidewall extending between the second annular bead and a second shoulder. The second shoulder is associated with the circumferential tread. The assembly also includes an electronics package and a securing element. The securing element has at least a bottom surface, a top surface, a height, a width, and a length. The height of the securing element is less than 50% of a tire section height, the width of the securing element is less than 120% of a tread width, and the length of the securing element is less than 50% of a circumference of the tire. The bottom surface of the securing element is configured to lie flat against the innerliner and the top surface of the securing element is opposite the bottom surface and is also configured to lie flat against the innerliner. The electronics package is attached to the securing element and configured to monitor at least one condition in the tire. The securing element is not attached to the innerliner.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

While similar terms used in the following descriptions describe common tire components, it is understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
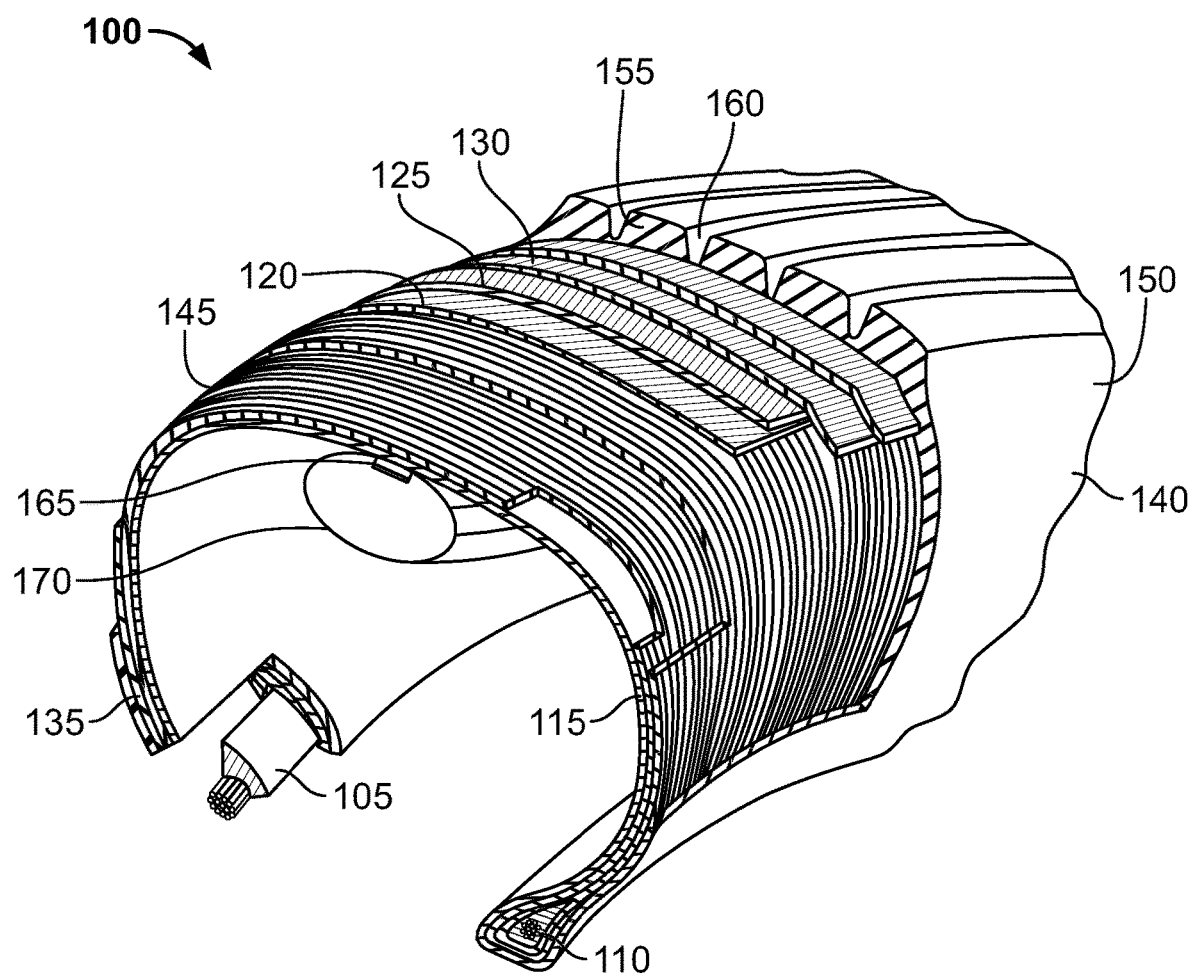
FIG. 1 is a peel-away cross-sectional perspective view of one embodiment of a tire and electronics package securing structure.

FIG. 1 is a peel-away cross-sectional perspective view of one embodiment of a tire 100 and electronics package securing structure. As shown, tire 100 features a first annular bead 105 and a second annular bead 110. The annular beads, in part, secure the tire to a wheel. In an alternative embodiment (not shown), the tire comprises four or more beads.

Tire 100 further features a body ply 115 extending between the first annular bead 105 and the second annular bead 110. Body ply 115 imparts shape to the tire. As one of ordinary skill in the art will understand, body ply 115 may contain reinforcing cords or fabric (not shown). In an alternative embodiment (not shown), the body ply forms a quick 2 construction.

Tire 100 further comprises a circumferential belt 120. Circumferential belt 120 is disposed radially upward of body ply 115 and extends axially across a portion of body ply 115. As one of ordinary skill in the art will understand, circumferential belt 120 may contain steel cords and reinforcing cords (both not shown). In an alternative embodiment (not shown), the circumferential belt lacks metal.

With continued reference to FIG. 1, tire 100 further comprises a reinforcement ply 125. First reinforcement ply 125 is disposed radially upward of circumferential belt 120 and extends axially across a portion of body ply 115. As one of ordinary skill will understand, additional reinforcement plies may be utilized. The reinforcement plies strengthen and stabilize the tire. In alternative embodiments (not shown), the tire contains one or three or more reinforcement plies. In another embodiment, the reinforcement plies are omitted.

Tire 100 further comprises a cap ply 130. Cap ply 130 is disposed radially upward of circumferential belt 120 and second reinforcement ply 130. Cap ply 130 extends axially across a portion of body ply 115. In an alternative embodiment (not shown), a sealing gel layer is provided in the cap ply region.

As shown, tire 100 further comprises a first sidewall 135 and a second sidewall 140. First sidewall 135 extends between the first annular bead 105 and a first shoulder 145, which is proximately associated with an edge of circumferential tread 155. Second sidewall 140 extends between the second annular bead 110 and a second shoulder 150, which is proximately associated with the opposite edge of circumferential tread 155. In an alternative embodiment (not shown), the sidewall is proximately associated with an undertread (not shown).

In the illustrated embodiment, tire 100 further comprises a circumferential tread 155, which is separated by circumferential grooves 160. Circumferential tread 155 is disposed radially upward of reinforcement ply 125 and cap ply 130, and circumferential tread 155 extends axially across a portion of body ply 115 and between the shoulders 145, 150. Circumferential grooves 160 divide circumferential tread 155 into five ribs. In an alternative embodiment (not shown), tread blocks form the surface of the circumferential tread. In another embodiment, lugs form the surface of the circumferential tread. In a different embodiment, a slick surface forms the surface of the circumferential tread. As one of ordinary skill in the art will understand, tires featuring a slick surface are suited for applications requiring high grip, such as an airplane or racing tire might require.

As depicted, circumferential tread 155 is affixed to tire 100 when tire 100 is new. In an alternative embodiment (not shown), the circumferential tread is affixed as a retread.

An electronics package 165 is further provided in conjunction with tire 100. Electronics package 165 is disposed radially inward of the body ply 115 and extends axially across a portion of body ply 115 and between the shoulders 145, 150. In particular, as illustrated, electronics package 165 abuts the innerliner underneath circumferential belt 120. Electronics package 165 may contain a range of electronics devices. Exemplary devices include, without limitation, sensors (such as acceleration, temperature, pressure, strain sensors) and RFID devices. As one of ordinary skill in the art will understand, electronics packages come in a variety of shapes and sizes.

Annular hoop 170 is provided in conjunction with tire 100. Annular hoop 170 is disposed radially inward of the body ply 115 and extends axially across a portion of body ply 115, between the shoulders 145, 150. As illustrated, annular hoop 170 abuts the innerliner (e.g., an airtight layer on the lower side of the body ply) and electronics package 165. In an alternative embodiment (not shown), the annular hoop abuts the electronics package only. In another embodiment, the annular hoop further comprises a divot to receive an electronics package. The divot is generally complimentary in shape to a surface of the electronics package, and adhesives or bonding materials may be used to secure the electronics package within the divot. In yet another embodiment, the annular hoop contacts two or more electronics devices.

Annular hoop 170 is made of a material consisting essentially of open-cell reticulated foam. In a specific embodiment, the open-cell reticulated foam has a modulus between about 20-50 kPa. In alternative embodiments, the annular hoop contains a plastic component, such as a coil, spring, shell, or support core. In additional embodiments, the annular hoop contains a metal component, such as a coil, spring, shell, or support core.

Annular hoop 170, when unstressed, has a circumference that is larger than a circumference of tire 100. The hoop is then stressed (compressed) to fit into the tire cavity. When stressed, annular hoop 170 may exerts an upward force of up to approximately 100 psi on an electronics package and an inner surface of tire 100. In an alternative embodiment, the annular hoop exerts a force between 60-90 psi on an electronics package and an inner surface of tire. In another embodiment, the annular hoop exerts an upward force between approximately 10,000-100,000 N on an electronics package and an inner surface of tire. In different embodiments, the annular hoop exerts these forces on the electronics package alone.

While a pneumatic tire is shown in FIG. 1, the annular hoop may also be employed in the tread of a non-pneumatic tire. The basic structure of non-pneumatic tires is known in the art, and is not presented here.

Figure 2:
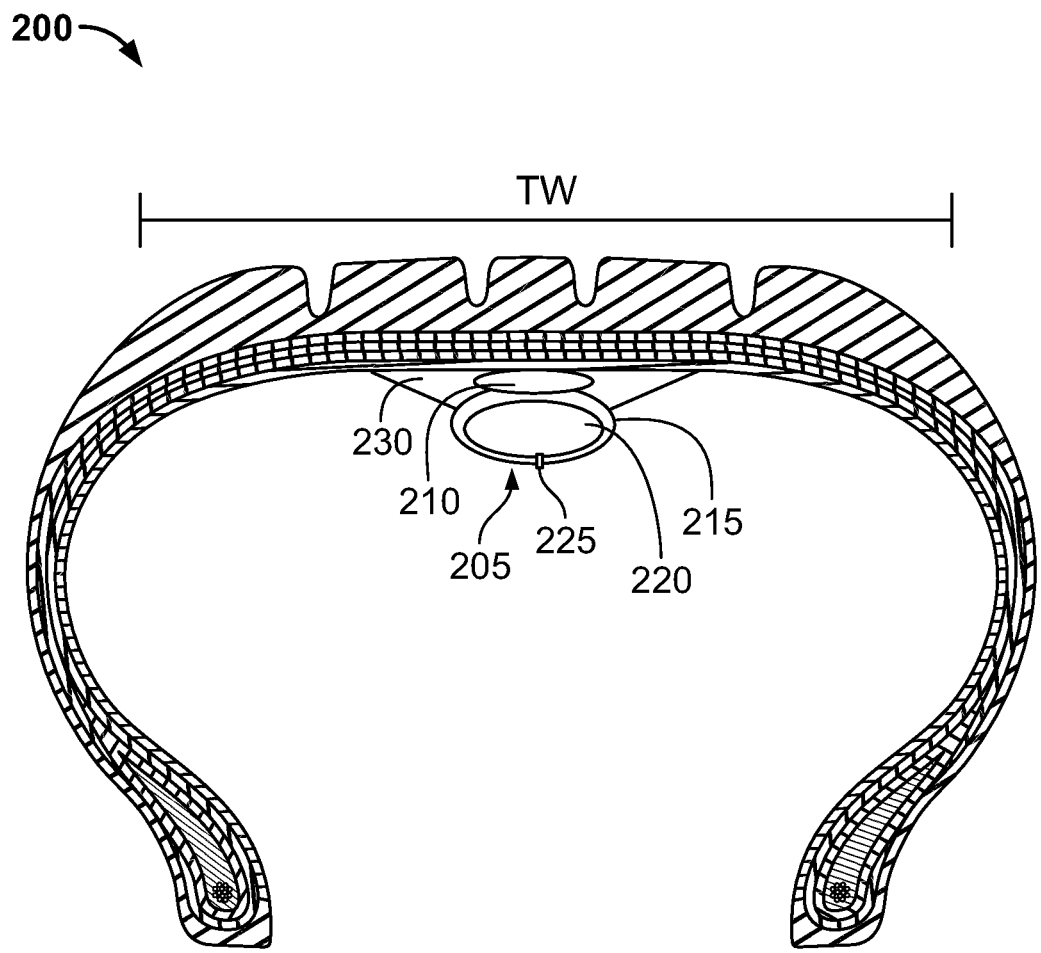
FIG. 2 is a cross sectional view of an alternative embodiment of a tire and electronics package securing structure.

FIG. 2 is a cross sectional view of one embodiment of a tire and electronics package securing structure. In particular, FIG. 2 shows an embodiment of a tire 200 with an electronics band 205 and electronics package 210.

Electronics band 205 is provided in conjunction with tire 200. As shown, electronics band 205 is located below an inner surface of the tire. In one embodiment, the electronics package is first disposed on the electronics band, and the band is then placed in the tire and inflated. In a different embodiment, the electronics package is self-expanding. In either of these embodiments, the electronics band 205 forms a complete annulus within the tire and secures electronics package 210 within tire 200 by applying a force against the electronics package 210.

As depicted, electronics band 205 comprises a tubular body 215 and a tubular chamber 220. Tubular body 215 is a round tube that defines the bounds of tubular chamber 215. As one of ordinary skill in the art will understand, the tubular body may come in a variety of shapes and sizes. In an alternative embodiment (not shown), the electronics package is bonded to the tubular body. The electronics package may be bonded on a radially inner or outer portion of the tubular body. In another embodiment, at least two electronics packages are bonded to the tubular body.

Although not shown, tubular body 215 and a tubular chamber 220 contain pressurized gas. Thus, electronics band 205 is placed within tire 200, or around a wheel (not shown), and then inflated. The size and position of the electronics band 205 are such that when the electronics band is inflated, it exerts an upward force on the electronics package 210, thereby pressing the electronics package 210 against an inner surface of the tire 200. In one embodiment, the tubular chamber is inflated to a pressure at least 10% greater than the recommended tire inflation pressure. In another embodiment, the tubular chamber is inflated to a pressure at least 20% greater than the recommended tire inflation pressure. In an alternative embodiment, gas is pressurized between 35-100 psi. In another embodiment, gas is pressurized between 45-65 psi. In a different embodiment, gas is pressurized between 100-200 psi. In yet another embodiment, tubular chamber is filled (e.g., with a foam). In a further embodiment, pressurized gas is not provided within the tubular body and chamber.

Tubular body 215 is made of a material consisting essentially of rubber. In an alternative embodiment, the tubular body is made of a material consisting essentially of foam, and the exterior or interior of tubular body is lined with an air-impermeable polymer. In a specific embodiment, the foam is an open-cell reticulated foam that has a modulus between about 20-50 kPa. In alternative embodiments, the tubular body contains a plastic component, such as a coil, spring, shell, or support core. In additional embodiments, the tubular body contains a metal component, such as a coil, spring, shell, or support core.

Electronics band 205 further comprises at least one inflation valve 225. Inflation valve 225 is used to inflate electronics band 205. In specific embodiments, the inflation valve is selected from the group of valves consisting of bladder, ball, check, Presta, and Schrader valves. As one of ordinary skill in the art will understand, the inflation valve is not limited to one particular location.

Electronics band 205 extends axially across a portion of the tread width TW. In the particular configuration shown in FIG. 2, the electronics band 205 extends axially across a majority of the intermediate and middle ribs (approximately 55% across the center of the tread width). In alternative embodiments (not shown), the electronics band extends across 5-40% of TW. In additional embodiments, the electronics band extends across 35-65% of TW. In different embodiments, the electronics band extends across 60-95% of TW. In further embodiments, the electronics band extends across at least 40% of TW.

As shown, electronics package 210 is a round package disposed on an inner surface of the tire, radially inward of the belt. As one of ordinary skill in the art will understand, the curvature of a surface of electronics package 210 may compliment the curvature of an inner surface of tire 200. In an alternative embodiment (not shown), the electronics package is bonded to the electronics band. The electronics package may be bonded on a radially inner or outer portion of the electronics band. In another embodiment, at least two electronics packages are bonded to the electronics band.

Electronics package 210 extends axially across a portion of the tread width TW. In the particular configuration shown in FIG. 2, the electronics package 210 extends axially across a width approximately equivalent to the width of the middle rib (approximately 12% across the center of the tread width TW). In alternative embodiments (not shown), the electronics package extends across 0.1-5.0% of TW. In additional embodiments, the electronics package extends across 8-40% of TW.

In the illustrated embodiment, electronics band 205 further comprises fins 230. Fins 230 are triangular extensions of band 205 that abut the inner surface of tire 200. As one of ordinary skill in the art will understand, the curvature of a surface of the fins 230 may compliment the curvature of an inner surface of tire 200. In embodiments where electronics band 205 provides a small force upon electronics package 210, fins 230 further stabilize the electronics band 205 and electronics package 210. In an alternative embodiment (not shown), the fins are omitted. In another embodiment, the fins encase (i.e., extend annularly around) the electronics band.

FIGS. 3a-3f are perspective views of alternative embodiments of the electronics package securing structures shown in FIGS. 1-2.

Figure 3A:
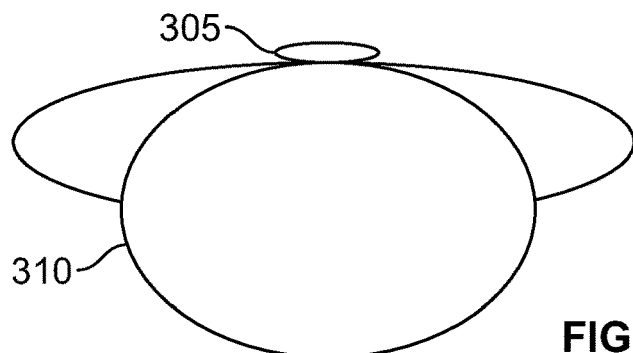
FIGS. 3a-3f are cross sectional views of alternative embodiments of the electronics package securing structures.

In particular, FIG. 3a shows an electronics package 305 and electronics package securing structure 310, which has a substantially cusped cross section.

Figure 3B:
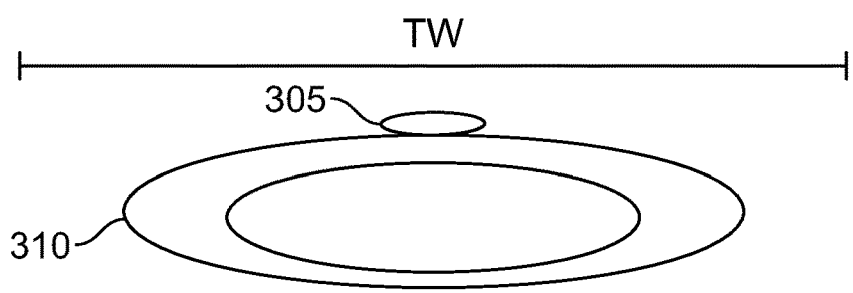

FIG. 3b shows an electronics package 305 and electronics package securing structure 310, which has an elongated elliptical cross section. The major axis of the ellipse is between 75-90% of TW.

Figure 3C:
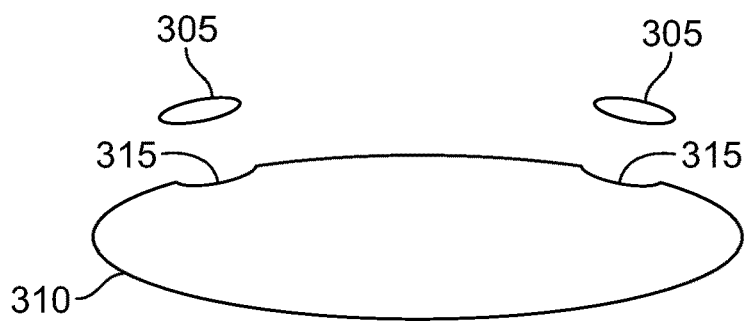

FIG. 3c shows electronics packages 305 and electronics package securing structure 310. Electronics package securing structure 310 has an elongated elliptical cross section with multiple divots 315.

Figure 3D:
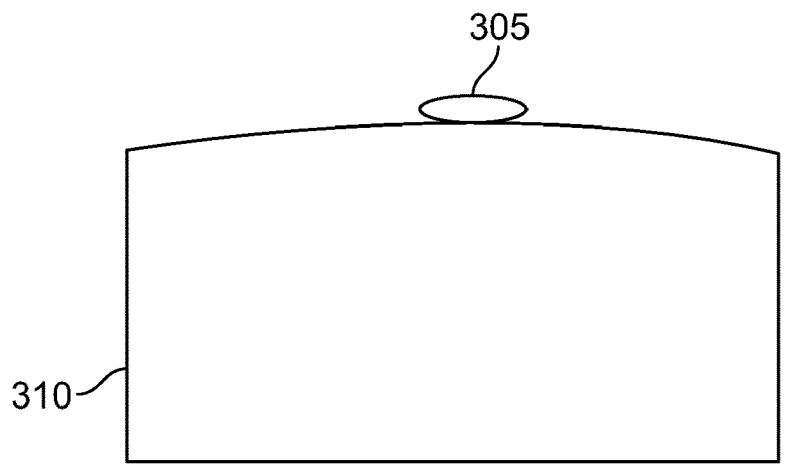

FIG. 3d shows an electronics package 305 and electronics package securing structure 310, which has a substantially rectangular cross section. In an alternative embodiment, electronics package securing structure has a substantially square cross section.

Figure 3E:
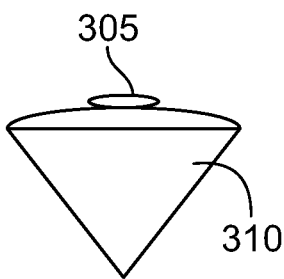

FIG. 3e shows an electronics package 305 and electronics package securing structure 310, which has a substantially triangular cross section.

Figure 3F:
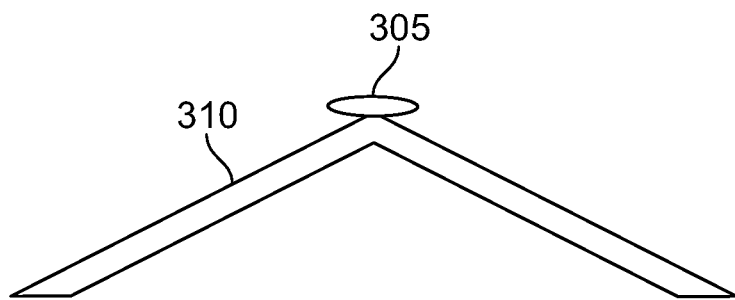

FIG. 3f shows an electronics package 305 and electronics package securing structure 310, which has a substantially chevron or v-shaped cross section. The ends of electronics package securing structure 310 contact a sidewall, bead, or wheel.

Thus, as FIGS. 3a-3f show, the electronics package securing structure may have a cross section selected from the group consisting of cusped arches, ellipses, elongated ellipses, substantially rectangular, substantially square, substantially triangular, or substantially chevron shaped. As one of ordinary skill in the art will understand, these shapes are merely exemplary, as bands of numerous cross sections may be employed.

In alternative embodiments (not shown) of the electronics package securing structures shown in FIG. 1, FIG. 2, and FIGS. 3a-3f, the electronics package securing structure is modular and may be pulled apart into annular segments. An elastic component, such as an elastic cord, is disposed in the interior of the annular segments. In variants of these embodiments, the elastic cord is omitted. The annular segments are placed within a tire, or on a wheel, and the electronics package securing structure is then assembled within the tire or around the wheel.

Figure 4:
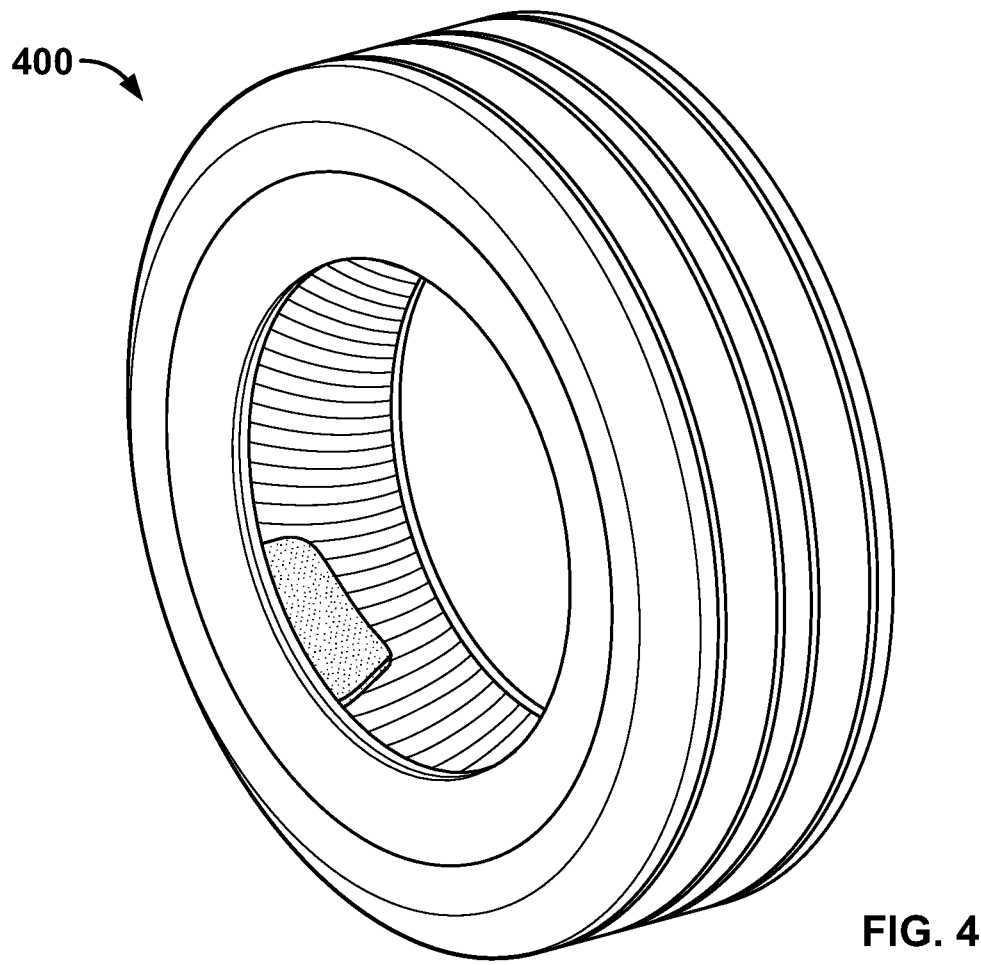
FIG. 4 is a perspective view of an embodiment of a membrane used to secure electronics packages.

FIG. 4 is a perspective view of an embodiment of a membrane used to secure electronics packages. In particular, FIG. 4 shows tire 400 and membrane 405 securing electronics package 410.

As shown, membrane 405 is simply placed within tire 400. Thus, no adhesives are used to secure membrane 405 within the tire. At increasing speeds, membrane 405 flattens as tire 400 rotates. In an alternative embodiment (not shown), adhesives or bonding agents are used to secure the membrane to the tire.

Membrane 405 is wider than it is long, and its width exceeds tread width TW (not shown). Because the width of membrane 405 exceeds tread width TW, membrane 405 curls along inner portions of the sidewalls. In an alternative embodiment (not shown), the width of the membrane is less than the tread width. In another embodiment (not shown), the length of the membrane is between 20-50% of the tire circumference. Configuring the length of the membrane between 20-50% of the tire circumference inhibits movement of the membrane within the tire cavity.

Although not shown, membrane 405 is made of a flexible material in one embodiment. Exemplary materials include, without limitation, rubbers, fabrics, foams, and leathers. In another embodiment, the membrane features round surfaces and is made of a semi-flexible material.

Figure 5:
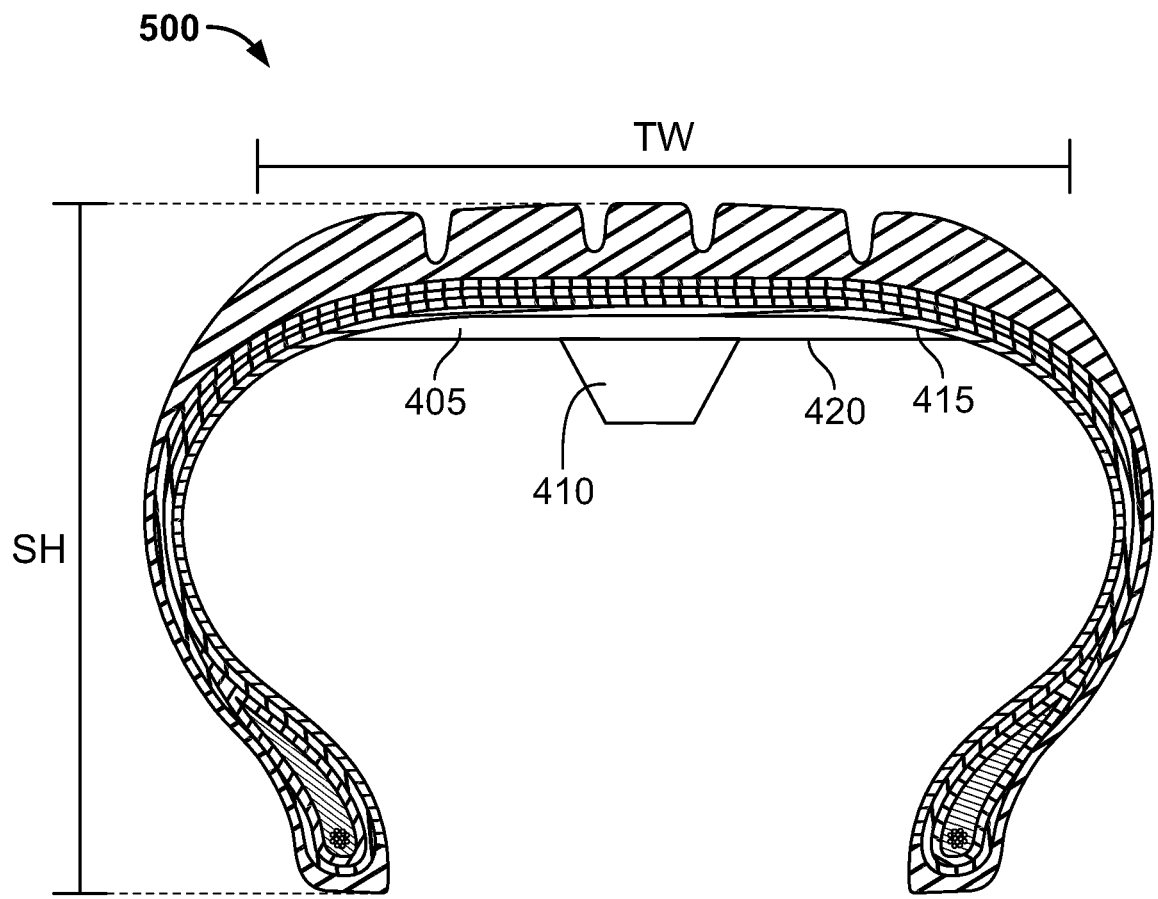
FIG. 5 is a cross sectional view of an alternative embodiment of the membrane shown in FIG. 4.

FIG. 5 is a cross sectional view of an alternative embodiment of the membrane shown in FIG. 4. In particular, FIG. 5 shows tire 500 and membrane 405 securing electronics package 410.

As shown in FIG. 5, membrane 405 further comprises a top surface 415 and a bottom surface 420. Preferably, top surface 415 and bottom surface 420 form a rounded edge. Although not shown, top surface 415 and bottom surface 420 are ovals. In an alternative embodiment, the top surface and bottom surface are polygons. In another embodiment, the bottom surface features dimples.

As depicted, the height of membrane 405 is less than the height of electronics package 410. As one of ordinary skill in the art will understand, the configuration shown in FIG. 5 allows for direct measurement or observation of the tire interior. In the embodiment shown, the membrane 405 and electronics package 410 collectively span approximately 16-20% of the section height SH. In an alternative embodiment (not shown), the membrane and electronics package span approximately 10-30% of the section height.

Figure 6:
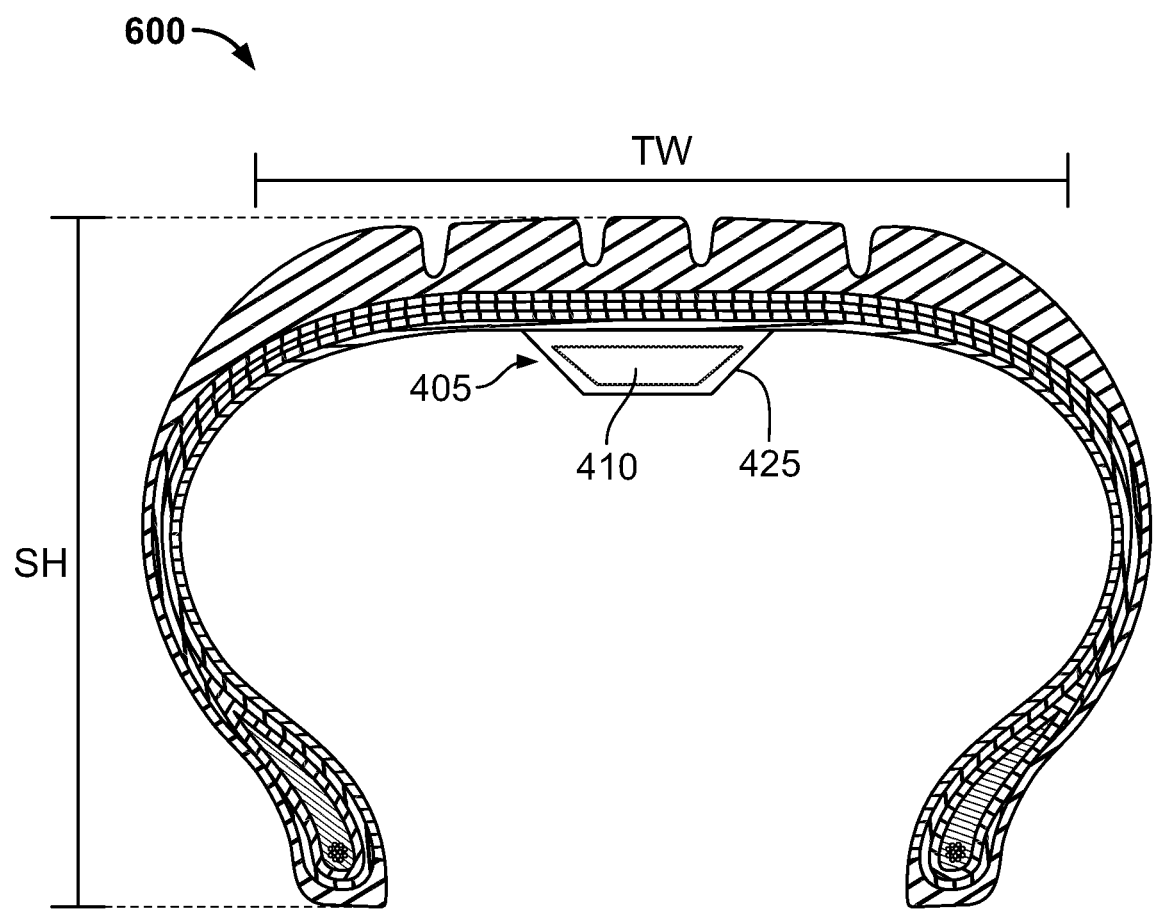
FIG. 6 is a cross sectional view of another alternative embodiment of the membranes shown in FIGS. 4-5.

FIG. 6 is a cross sectional view of an alternative embodiment of the membranes shown in FIGS. 4-5. In particular, FIG. 6 shows tire 600 and membrane 405 securing electronics package 410.

As shown in FIG. 6, membrane 405 further comprises a side wall 425. The side wall has a height and a width (not shown). In embodiments where membrane 405 is round, membrane 405 has a single side wall 425. In alternative embodiments (not shown), the membrane has exactly two side walls. In additional embodiments, the membrane has three, four, five, or more sidewalls. As one of ordinary skill in the art will understand, having side walls allows for distribution of weight in the membrane. Likewise, one of ordinary skill in the art will also understand that having sidewalls does not preclude the use of rounded edges.

As depicted, the height of the membrane 405 is greater than the height of electronics package 410. Further, membrane 405 encapsulates electronics package 410. As one of ordinary skill in the art will understand, the configuration shown in FIG. 6 allows for measurement or observation of the tire interior through membrane 405. In the embodiment shown, the membrane 405 (which encapsulates electronics package 410) spans approximately 8-10% of the section height SH. In an alternative embodiment (not shown), the membrane and electronics package span approximately 1-7% of the section height. In yet another embodiment, the membrane and electronics package span approximately 11-50% of the section height SH.

In an alternative embodiment (not shown), the membrane further comprises an elastic component that secures the membrane to the wheel. In one example of this embodiment, the membrane is placed on a wheel, and an elastic band is attached to the membrane at two distinct locations to secure the membrane to the wheel.

As one of ordinary skill in the art would understand, the structures and membranes of the described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications. One of ordinary skill in the art would also understand that the embodiments described in this disclosure may be utilized on large tires. Examples of large tires include, but are not limited to, agricultural tires, mining tires, forestry tires, skid steer tires, construction tires, monster-truck tires, and other heavy-duty vehicle tires.

As one of ordinary skill in the art will understand, the structures and membranes of described in this disclosure are suited for use in new tires or existing tires. Likewise, the structures and membranes of the present disclosure may be utilized in multiple tires. In other words, a particular structure or membrane may be used in a first tire for a first period of time and then removed from the first tire for use in a second tire for a second period of time. Thus, a particular structure or membrane may be used to observe a tire on one vehicle and then be used to observe a tire on a second vehicle.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2*d.* Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire, rim, and securing element assembly comprising:
    a rim;
    a tire mounted on the rim and inflated at a first pressure, the tire including:
        a first annular bead and a second annular bead,
        a body ply extending between the first annular bead and the second annular bead,
        an innerliner extending between the first annular bead and the second annular bead across at least a portion of a surface of the body ply,
        a circumferential belt disposed radially upward of the body ply and extending axially across a portion of the body ply,
        a circumferential tread disposed radially upward of the circumferential belt and extending axially across a portion of the body ply,
        a first sidewall extending between the first annular bead and a first shoulder, the first shoulder being associated with the circumferential tread, and
        a second sidewall extending between the second annular bead and a second shoulder, the second shoulder being associated with the circumferential tread;
    a securing element having an annular, flexible, inflatable, tubular body inflated at a second pressure that is at least 10% greater than the first pressure, wherein the securing element contacts a portion of the innerliner; and
    an electronics package bonded to the securing element.

2. The tire, rim, and securing element assembly of claim 1, wherein the electronics package includes two or more electronics packages that are bonded to the securing element.

3. The tire, rim, and securing element assembly of claim 1, wherein the securing element further comprises fins that contact the innerliner.

4. The tire, rim, and securing element assembly of claim 1, wherein an inner cross section of the securing element is triangular.

5. The tire, rim, and securing element assembly of claim 1, further comprising an inflation valve disposed on the securing element, wherein the inflation valve is selected from the group consisting of bladder, ball, check, Presta, and Schrader valves.

6. The tire, rim, and securing element assembly of claim 1, wherein the second pressure is at least 20% greater than the first pressure.

7. A tire, rim, and securing element assembly comprising:
    a rim;
    a tire mounted on the rim and inflated at a first pressure, the tire including:
        a first annular bead and a second annular bead,
        a body ply extending between the first annular bead and the second annular bead,
        an innerliner extending between the first annular bead and the second annular bead across at least a portion of a surface of the body ply,
        a circumferential belt disposed radially upward of the body ply and extending axially across a portion of the body ply,
        a circumferential tread disposed radially upward of the circumferential belt and extending axially across a portion of the body ply,
        a first sidewall extending between the first annular bead and a first shoulder, the first shoulder being associated with the circumferential tread, and
        a second sidewall extending between the second annular bead and a second shoulder, the second shoulder being associated with the circumferential tread; and
    a securing element having an annular, flexible, inflatable, tubular body inflated at a second pressure that is at least 10% greater than the first pressure, wherein the securing element contacts a portion of the innerliner at a location opposite the tread in a crown region of the tire, wherein the securing element includes fins that contact the innerliner.

8. The tire, rim, and securing element assembly of claim 7, wherein two or more electronics packages are bonded to the securing element.

9. The tire, rim, and securing element assembly of claim 7, wherein an inner cross section of the securing element is triangular.

10. The tire, rim, and securing element assembly of claim 7, further comprising an inflation valve disposed on the securing element, wherein the inflation valve is selected from the group consisting of bladder, ball, check, Presta, and Schrader valves.

11. The tire, rim, and securing element assembly of claim 7, wherein the second pressure is at least 20% greater than the first pressure.

12. A tire, rim, and securing element assembly comprising:
a rim;
a tire mounted on the rim and inflated at a first pressure, the tire including:
a first annular bead and a second annular bead,
a body ply extending between the first annular bead and the second annular bead,
an innerliner extending between the first annular bead and the second annular bead across at least a portion of a surface of the body ply,
a circumferential belt disposed radially upward of the body ply and extending axially across a portion of the body ply,
a circumferential tread disposed radially upward of the circumferential belt and extending axially across a portion of the body ply,
a first sidewall extending between the first annular bead and a first shoulder, the first shoulder being associated with the circumferential tread, and
a second sidewall extending between the second annular bead and a second shoulder, the second shoulder being associated with the circumferential tread;
a securing element having an annular, flexible, inflatable, tubular body inflated at a second pressure that is at least 10% greater than the first pressure, wherein the securing element contacts a portion of the innerliner, wherein an inner cross section of the securing element is triangular.

13. The tire, rim, and securing element assembly of claim 12, wherein two or more electronics packages are bonded to the securing element.

14. The tire, rim, and securing element assembly of claim 12, further comprising an inflation valve disposed on the securing element, wherein the inflation valve is selected from the group consisting of bladder, ball, check, Presta, and Schrader valves.

15. The tire, rim, and securing element assembly of claim 12, wherein the second pressure is at least 20% greater than the first pressure.

* * * * *